United States Patent
Kim et al.

(10) Patent No.: US 10,373,367 B2
(45) Date of Patent: Aug. 6, 2019

(54) METHOD OF RENDERING 3D IMAGE AND IMAGE OUTPUTTING DEVICE THEREOF

(71) Applicant: SAMSUNG ELECTRONICS CO., LTD., Suwon-si (KR)

(72) Inventors: Jung-bum Kim, Seoul (KR); Jong-pil Park, Yongin-si (KR); Sang-jun Ahn, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 293 days.

(21) Appl. No.: 14/827,865

(22) Filed: Aug. 17, 2015

(65) Prior Publication Data

US 2016/0071311 A1  Mar. 10, 2016

(30) Foreign Application Priority Data

Sep. 5, 2014 (KR) .................. 10-2014-0119088

(51) Int. Cl.
*G06T 15/06* (2011.01)
*G06T 15/00* (2011.01)
*G06T 15/04* (2011.01)

(52) U.S. Cl.
CPC ............ *G06T 15/06* (2013.01); *G06T 15/005* (2013.01); *G06T 15/04* (2013.01); *G06T 2200/04* (2013.01)

(58) Field of Classification Search
CPC ....... G06T 15/506; G06T 15/50; G06T 15/80; G06T 15/60; G06T 15/06
See application file for complete search history.

(56) References Cited

U.S. PATENT DOCUMENTS

| | | | | |
|---|---|---|---|---|
| 3,854,047 A | * | 12/1974 | Suhami | G01T 1/1642 250/366 |
| 5,647,018 A | * | 7/1997 | Benjamin | G06T 11/006 250/398 |
| 5,944,748 A | * | 8/1999 | Mager | A61N 5/0601 606/11 |
| 6,430,427 B1 | * | 8/2002 | Lee | A61B 6/505 382/128 |
| 6,760,024 B1 | * | 7/2004 | Lokovic | G06T 15/06 345/421 |
| 6,836,285 B1 | * | 12/2004 | Lubard | G01S 7/4802 348/31 |
| 7,133,041 B2 | * | 11/2006 | Kaufman | G06T 15/06 345/419 |
| 2003/0156187 A1 | * | 8/2003 | Gluckman | H04N 13/218 348/46 |
| 2004/0125103 A1 | * | 7/2004 | Kaufman | G06T 15/06 345/419 |
| 2007/0040830 A1 | * | 2/2007 | Papageorgiou | G06T 15/08 345/424 |
| 2007/0182732 A1 | * | 8/2007 | Woop | G06T 15/005 345/420 |
| 2007/0183590 A1 | * | 8/2007 | Gray | G03B 42/02 378/207 |

(Continued)

*Primary Examiner* — Abderrahim Merouan
(74) *Attorney, Agent, or Firm* — Sugrue Mion, PLLC

(57) ABSTRACT

A method for rendering a three-dimensional (3D) image and an image outputting device that is configured to perform the method are provided. The method includes: loading a 3D screen; calculating a ray density of each region of the loaded 3D screen in order to generate a rendering map; rendering the 3D screen by using the rendering map; and outputting the rendered 3D screen.

20 Claims, 7 Drawing Sheets

(56) References Cited

U.S. PATENT DOCUMENTS

| | | | |
|---|---|---|---|
| 2007/0206008 A1* | 9/2007 | Kaufman | G06T 15/06 345/424 |
| 2007/0242797 A1* | 10/2007 | Stewart | A61B 6/02 378/16 |
| 2007/0247460 A1* | 10/2007 | Smitt | G06T 15/50 345/427 |
| 2007/0262983 A1* | 11/2007 | Choi | G06T 15/04 345/420 |
| 2008/0031402 A1* | 2/2008 | Xue | G06T 15/08 378/4 |
| 2009/0096789 A1* | 4/2009 | Peterson | G06T 15/06 345/426 |
| 2011/0058726 A1* | 3/2011 | Markwardt | G06T 7/0014 382/132 |
| 2013/0050213 A1* | 2/2013 | McCombe | G06T 15/06 345/426 |
| 2014/0292757 A1* | 10/2014 | Tokuyoshi | G06T 15/50 345/426 |
| 2016/0042558 A1* | 2/2016 | Park | G06T 15/06 345/426 |
| 2016/0314610 A1* | 10/2016 | Lee | G06T 15/005 |

* cited by examiner

METHOD OF RENDERING 3D IMAGE AND IMAGE OUTPUTTING DEVICE THEREOF

CROSS-REFERENCE TO RELATED APPLICATION(S)

This application claims priority under 35 U.S.C. § 119 from Korean Patent Application No. 10-2014-0119088, filed on Sep. 5, 2014, in the Korean Intellectual Property Office, the disclosure of which is incorporated herein by reference in its entirety.

BACKGROUND

1. Field

Exemplary embodiments relate to providing a method of rendering a three-dimensional (3D) image and an image outputting device configured to perform the method, and more particularly, to providing a method of analyzing a 3D image in order to render the 3D image according to a plurality of rendering methods, and an image outputting device configured to perform the method.

2. Description of the Related Art

There is a basic rasterization rendering method which is currently used as a conventional rendering method of generating a 3-dimensional (3D) image. Further, a performance improvement technique based on an arithmetic operation only for a graphic processing unit (GPU) has been used to improve a rendering velocity. As another existing rendering method of generating a 3D image, there is a ray tracing rendering method for global illumination rendering. As another method of generating a 3D image, there is a method of applying additional post-processing to an image region after completion of a rendering process to generate a 3D image.

However, if a 3D image is rendered according to the basic rasterization rendering method, a step effect occurs, and a realistic 3D image is not provided. In order to solve these problems, if a 3D image is rendered according to a ray tracking rendering method, a more realistic and vivid image may be acquired.

In the ray tracking rendering method, an arithmetic throughput for rendering is determined according to the number of rays. Therefore, if the same ray is irradiated onto all regions to perform rendering, an image outputting device processes a considerable amount of data at a relatively high throughput rate for rendering.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a method for calculating ray densities of respective regions of a 3D image in order to render the 3D image, and an image outputting device configured to perform the method.

According to an aspect of the exemplary embodiments, there is provided a method for rendering a 3-dimensional (3D) image, the method including: loading a 3D screen; calculating a ray density of each region of the loaded 3D screen to generate a rendering map; rendering the 3D screen by using the rendering map; and outputting the rendered 3D screen.

The generating the rendering map may include: determining whether a first region of the loaded 3D screen is a reflective region or a refractive region; calculating an importance of ray tracing in response to the first region being determined as the reflective region or the refractive region; and calculating a ray density based on the calculated importance of the ray tracing.

The calculating the importance of the ray tracing may include: when the first region is determined as being located within a predetermined distance with respect to a camera or a normal vector with respect to the first region is determined as being within a first predetermined angular displacement from a perpendicular direction with respect to a camera direction, calculating the importance of the ray tracing as having a value that is greater than a predetermined threshold; and when the first region is determined as being located farther away from the camera than the predetermined distance or the normal vector with respect to the first region is determined as being within a second predetermined angular displacement from a parallel direction with respect to the camera direction, calculating the importance of the ray tracing as having a value that is lower than the predetermined threshold.

The calculating the importance of the ray tracing may include: calculating at least one from among a velocity of an object included in the 3D screen and an acceleration of the object included in the 3D screen; and when the calculated at least one from among the velocity and the acceleration is equal to or less than a preset value, the importance of the ray tracing is calculated as having a value that increases in correspondence with an increase in the velocity or the acceleration of the object, and when the calculated at least one from among the velocity and the acceleration is greater than the preset value, the importance of the ray tracing is calculated as having a value that decreases in correspondence with an increase in the velocity or the acceleration of the object.

The calculating the ray density may include: adjusting a number of rays incident onto a particular region based on the calculated importance of the ray tracing and dividing the number of rays incident onto the particular region by a pixel size of the particular region.

The method may further include: determining whether the calculated ray density is lower than a preset value; and when the calculated ray density of a first region is determined as being lower than a preset value, designating the preset value as a ray density of the first region, and when the calculated ray density of a second region is determined as being greater than or equal to the preset value, designating the calculated ray density of the second region as a ray density of the second region.

The method may further include: when a third region is determined as not being the refractive region or the refractive region, designating a ray density of the third region as being equal to zero.

The generating the rendering map may further include: generating a rendering map that has a gray scale that corresponds to the designated ray density.

The rendering the 3D screen may include: when the ray density of the third region is designated as being equal to zero, rendering the third region of the 3D screen by using a rasterization rendering method, and when the calculated ray density of the second region is determined as being greater than the preset value, rendering the second region of the 3D screen by using a ray tracing rendering method.

The rendering the 3D screen may further include: when the designated ray density for a particular region is equal to one, irradiating rays onto all pixels of the particular region; and when the designated ray density for the particular region is greater than or equal to the preset value and lower than one, irradiating rays onto some pixels of the particular region.

The rendering the 3D screen may further include: when the designated ray density for the particular region is greater than or equal to the preset value and lower than one, interpolating a pixel onto which a ray is not irradiated by using a pixel onto which a ray is irradiated.

According to another aspect of the exemplary embodiments, there is provided an image outputting device including: a loader configured to load a 3D screen; a rendering map generator configured to calculate a ray density of each region of the loaded 3D screen in order to generate a rendering map; a renderer configured to render the 3D screen by using the rendering map; and an output module configured to output the rendered 3D screen.

The rendering map generator may be further configured to determine whether each region of the loaded 3D screen is a reflective region or a refractive region, to calculate an importance of ray tracing in response to the region being determined as the reflective region or the refractive region, and to calculate a ray density based on the calculated importance of the ray tracing.

The rendering map generator may be further configured to calculate the importance of the ray tracing as having a value that is greater than a predetermined threshold value when a particular region is determined as being located within a predetermined distance with respect to a camera or when a normal vector with respect to the particular region is determined as being within a first predetermined angular displacement from a perpendicular direction with respect to a camera direction, and to calculate the importance of the ray tracing as having a value that is lower than the predetermined threshold value when the particular region is determined as being located farther away than the predetermined distance with respect to the camera or when the normal vector with respect to the particular region is determined as being within a second predetermined angular displacement from a parallel direction with respect to the camera direction.

The rendering map generator may be further configured to calculate at least one from among a velocity of an object included in the 3D screen and an acceleration of the object included in the 3D screen, to calculate the importance of the ray tracing as having a value that increases in correspondence with an increase in a value of the velocity or the acceleration of the object when the calculated at least one from among the velocity and the acceleration is lower than or equal to a preset value, and to calculate the importance of the ray tracing as having a value that decreases in correspondence with an increase in the velocity or the acceleration of the object when the calculated at least one from among the velocity and the acceleration is greater than the preset value.

The rendering map generator may be further configured to adjust a number of rays incident onto a particular region based on the calculated importance of the ray tracing and to divide the number of rays incident onto the particular region by a pixel size of the particular region in order to calculate the ray density.

The rendering map generator may be further configured to determine whether the calculated ray density is lower than a preset value, and when the calculated ray density of a first region is determined as being lower than a preset value, to designate the preset value as a ray density of the first region, and when the calculated ray density of a second region is determined as being greater than or equal to the preset value, to designate the calculated ray density of the second region as a ray density of the second region.

The rendering map generator may be further configured to designate the ray density of a third region as being equal to zero when the third region is determined as not being the reflective region or the refractive region.

The rendering map generator may be further configured to generate a rendering map that has a gray scale that corresponds to the designated ray density.

When the ray density of the third region is designated as being equal to zero, the renderer may be further configured to render the third region of the 3D screen by using a rasterization rendering method, and when the calculated ray density of the second region is determined as being greater than the preset value, the renderer may be further configured to render the second region of the 3D screen by using a ray tracing rendering method.

When the designated ray density for a particular region is equal to one, the renderer may be further configured to irradiate rays onto all pixels of the particular region, and when the designated ray density for the particular region is greater than or equal to the preset value and lower than one, the renderer may be further configured to irradiate rays onto some pixels of the particular region.

When the designated ray density for the particular region is greater than or equal to the preset value and lower than one, the renderer may be further configured to interpolate a pixel onto which a ray is not irradiated by using a pixel onto which a ray is irradiated.

According to various exemplary embodiments, a 3D screen, which has a quality with no great difference in comparison with an existing ray tracing rendering method, is output. Simultaneously, an amount of an arithmetic operation may be reduced to output a 3D image at a faster processing velocity.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
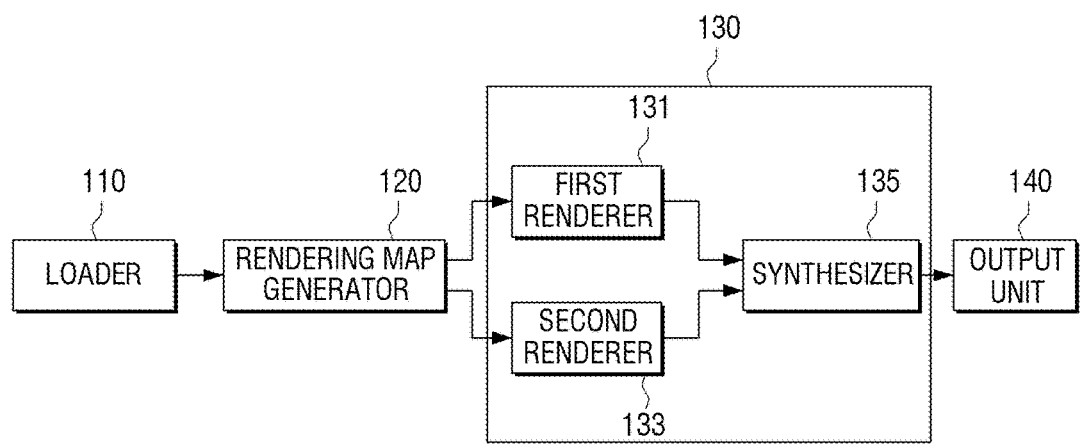
FIG. 1 is a block diagram illustrating a structure of an image outputting device, according to an exemplary embodiment.

Exemplary embodiments are described below in greater detail with reference to the accompanying drawings.

The exemplary embodiments may be diversely modified. Accordingly, specific exemplary embodiments are illustrated in the drawings and are described in detail in the detailed description. However, it is to be understood that the present disclosure is not limited to a specific exemplary embodiment, but includes all modifications, equivalents, and substitutions without departing from the scope and spirit of the present disclosure. Also, well-known functions or constructions are not described in detail since they would obscure the present disclosure with unnecessary detail.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a block diagram illustrating a structure of an image outputting device 100, according to an exemplary embodiment. As shown in FIG. 1, the image outputting device 100 includes a loader 110, a rendering map generator 120, a renderer 130, and an output unit (also referred to herein as an "output module" and/or as an "outputter") 140. The image outputting device 100 according to the present exemplary embodiment may be a smartphone, but this is only an exemplary embodiment. Therefore, the image outputting device 100 may be realized as any of various types of image outputting devices, such as a tablet personal computer (PC), a notebook PC, a desktop PC, a personal digital assistant (PDA), a smart television (TV), etc., and each of the loader 110, the rendering map generator 120, the renderer 130, and the output unit 140 may be implemented by a processor included in the image outputting device 100.

The loader 110 loads data that relates to an input 3-dimensional (3D) screen. In particular, the 3D screen may be a pre-stored background screen, but this is only an exemplary embodiment. Therefore, the 3D screen may be another type of 3D screen. For example, the 3D screen may be a 3D image that is received from an external device, such as a server or the like.

The rendering map generator 120 calculates a ray density of each region of the loaded 3D screen in order to generate a rendering map. In particular, the ray density may refer to the number of rays irradiated onto a particular region if rendering is performed by using a ray tracing rendering method.

In detail, the rendering map generator 120 rasterizes the loaded 3D screen. An object that forms the 3D screen by performing a rasterization job may be mapped on each region of an output frame buffer.

In this aspect, the rendering map generator 120 may determine whether each region of the 3D screen is a reflective region or a refractive region. In particular, the rendering map generator 120 may determine whether each region of the 3D screen is the reflective region or the refractive region based on data that relates to the loaded 3D screen. More particularly, the reflective region or the refractive region of the 3D screen may be designated by a maker of the 3D screen and may be stored in the data that relates to the 3D screen.

The rendering map generator 120 calculates an importance of ray tracing of the reflective region or the refractive region of the 3D screen. In particular, the rendering map generator 120 may calculate the importance of the ray tracing by using Equation 1 below:

$$\text{importance} = c\frac{1}{d}\left(1 + \sqrt{1 - (\cos\theta)^2}\right) \quad (1)$$

wherein c may denote a coefficient, d may denote a distance between a camera and a corresponding region, and θ may denote an angle of a normal vector with respect to a camera direction and the corresponding region.

In this aspect, the rendering map generator 120 may calculate an importance of ray tracing as having a relatively high value when a region is relatively close to the camera or a normal vector with respect to the camera direction and the region is relatively close to vertical. However, the rendering map generator 120 may calculate the importance of the ray tracing as having a relatively low value when the region is relatively far away from the camera or the normal vector with respect to the camera direction and the region is close to parallel.

If an input 3D image is a dynamic image within which an object moves, the rendering map generator 120 may calculate an importance of ray tracing by using one selected from among a velocity and an acceleration of the object included in the input 3D image.

Figure 6:
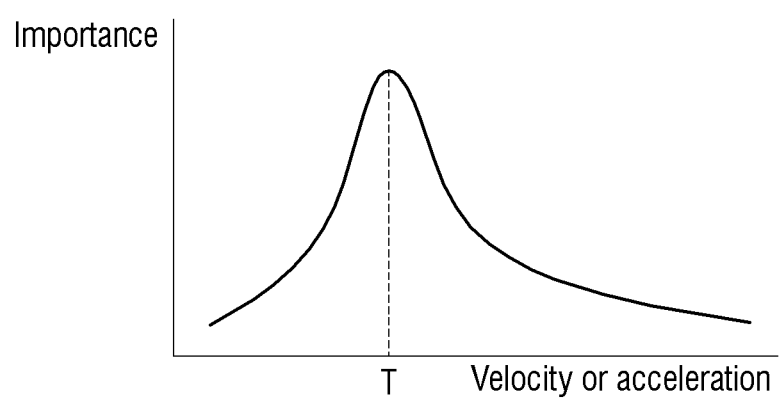
FIG. 6 is a graph illustrating an importance of ray tracing according to a velocity or an acceleration, according to an exemplary embodiment.

According to an exemplary embodiment, the rendering map generator 120 may calculate an importance of ray tracing based on a velocity or an acceleration by using a graph as shown in FIG. 6. In detail, the rendering map generator 120 may determine a movement amount of an object included in consecutive frames included in a 3D image in order to calculate a velocity, or may determine changes in a velocity between the consecutive frames in order to calculate an acceleration. Further, if the velocity or the acceleration of the object is lower than or equal to a preset value T, the rendering map generator 120 may calculate an importance of ray tracing of a region where an object is displayed as having a value that increases with an increase in the calculated velocity or acceleration. However, if the velocity or acceleration of the object exceeds the preset value T, the rendering map generator 120 may calculate the importance of the ray tracing of the region where the object is displayed as having a value that decreases with the increase in the velocity or acceleration. This is because of the following reason: Even though object that moves may be deemed as having a relatively high importance, if the velocity of the object is too fast, then a person may have difficulty in identifying the object, and thus an importance of the object is reduced. Further, the rendering map generator 120 may adjust a value of c of Equation 1 according to the velocity or the acceleration in order to calculate the importance of the ray tracing of the region where the object is displayed.

Further, the rendering map generator 120 may calculate a ray density based on the importance of ray tracing of a reflective region or a refractive region. In particular, the importance of the ray tracing may refer to the number of rays incident into a particular region, and the rendering map generator 120 may divide the number of rays incident onto the particular region by a pixel size of the particular region in order to calculate a ray density, as expressed in Equation 2 below:

$$\text{ray density} = \frac{\text{the number of rays for a region}}{\text{the size of a region in pixels}} \quad (2)$$

In this aspect, if the calculated ray density is too low, a user may recognize a deterioration in a rendering quality. Therefore, the rendering map generator 120 may determine whether the calculated ray density is lower than a preset threshold value.

In detail, if a calculated ray density of a first region is lower than a preset threshold value, the rendering map generator 120 may designate the ray density of the first region as being equal to the preset threshold value. Further, if a calculated ray density of a second region is higher than or equal to the preset threshold value, the rendering map generator 120 may designate a ray density of the second region as being equal to the calculated ray density.

For example, if the preset threshold value is 0.5, and the calculated ray density of the first region is 0.3, the rendering map generator 120 may designate a ray density of the first region as being equal to 0.5. If a calculated ray density of the second region is 0.7, the rendering map generator 120 may designate a ray density of the second region as being equal to 0.7.

Further, the rendering map generator 120 may designate a ray density of a region which does not qualify as being either of a reflective region or a refractive region as 0. In detail, the region that is neither the reflective region nor the refractive region is not rendered according to a ray tracing rendering method. However, although the region that is not the reflective region or the refractive region may be rendered by using a rasterization rendering method, and therefore, there is no significant difference in a resultant quality of an image.

Figure 2:
FIG. 2 is a view illustrating a rendering map representing a rendering method, according to an exemplary embodiment.

The rendering map generator 120 may also generate a rendering map based on a ray density of each region calculated as described above. In particular, the rendering map generator 120 may generate a rendering map that has a gray scale that corresponds to a designated ray density. In detail, as a ray density of a corresponding region approaches zero, the rendering map generator 120 may set a gray scale of the corresponding region to be close to 255. As the ray density of the corresponding region approaches one (1), the rendering map generator 120 may set the gray scale of the corresponding region to be close to zero. For example, the rendering map generator 120 may generate a rendering map as shown in FIG. 2.

The renderer 130 may perform a rendering job with respect to the 3D screen by using the rendering map. In particular, as shown in FIG. 1, the renderer 130 may include a first renderer 131 and a second renderer 133. Further, the first renderer 131 may perform a rendering job as a graphic processing unit (GPU) or hardware that is configured only for performing ray tracing rendering according to a ray tracing rendering method. In addition, the second renderer 133 may perform a rendering job as a central processing unit (CPU) or another GPU according to a rasterization rendering method. In this aspect, the ray tracing rendering method is a method of calculating a path of light on each pixel of a screen and associating a color with a ray density of each pixel in order to generate the screen. The ray tracing rendering method may have an advantage of generating a clear and natural screen, and a disadvantage of requiring a vast amount of calculation. The rasterization rendering method is a method of converting vector or contour data into a pixel pattern image that corresponds to the vector or contour data in order to generate a screen. The rasterization rendering method may have an advantage of enabling a fast rendering job and a disadvantage of disabling a realistic light expression and outputting of an unnatural rendering result, such as a step effect or the like.

In detail, the renderer 130 may render the 3D screen by using any of various methods based on the rendering map. In particular, the renderer 130 may render any region of the rendering map for which a ray density is greater than than or equal to a preset value according to a ray tracing rendering method by using the first renderer 131. The renderer 130 may render any region of the rendering map that has a ray density of zero according to the rasterization rendering method by using the second renderer 133.

As described above, although the region that has the ray density of zero, i.e., a reflective region or a refractive region, is rendered by using the rasterization rendering method, there is no significant difference in a quality of the region. Therefore, the renderer 130 may render the region that has the ray density of zero by using the second renderer 133.

Further, the renderer 130 may irradiate rays onto all pixels of a region that has a ray density of one in order to render the region that has the ray density of one. The renderer 130 may determine the number of rays which will be irradiated based on a ray density that is greater than or equal to a preset value and lower than one, and irradiate rays onto some pixels of a region for which the ray density is greater than or equal to the preset value and lower than one based on the determined number of rays so as to render the region. For example, if a size of a corresponding region is 10 pixels and a ray density of the corresponding region is 0.7, the renderer 130 may irradiate rays onto seven of the ten pixels. In particular, the renderer 130 may select one of all pixels onto which rays will be irradiated, according to an evenly distributed method.

If a ray density of a region is greater than or equal to a preset value and lower than one, there may be pixels onto which rays will be irradiated. In particular, the renderer 130 may interpolate a pixel onto which a ray is not irradiated by using an adjacent pixel onto which a ray is irradiated. For example, if a size of a corresponding region is 10 pixels, and a ray density of the corresponding region is 0.7, the renderer 130 may interpolate three pixels, onto which rays are not irradiated, by using the remaining seven pixels onto which rays are irradiated.

The renderer 130 may perform a rendering job in parallel by using the first renderer 131 and the second renderer 133. Therefore, the renderer 130 may render a 3D image at a faster velocity.

Further, the renderer 130 may synthesize a rendering result rendered by the first renderer 131 and a rendering result rendered by the second renderer 133. In detail, if the rendering result rendered by the first renderer 131 is output into a memory of a frame buffer, and the rendering result rendered by the second renderer 133 is output into the memory of the frame buffer, a synthesizer 135 may synthesize a rendering result rendered by a ray tracing rendering method and a rendering result rendered by a rasterization rendering method in order to generate a 3D image.

The synthesizer 135 may use an arithmetic operation that is specialized for the frame buffer in order to perform an efficient synthesis, and may perform a post-processing arithmetic operation on a finally generated 3D screen.

The output unit 140 outputs the synthesized 3D screen. In this aspect, the output unit 140 may be realized as an output unit such as a display, but this is only an exemplary embodiment. Therefore, as an alternative, the output unit 140 may be realized as a printing unit, such as a printer or the like.

As described above, the image outputting device 100 may perform a rendering job by using a ray tracing rendering method or a rasterization rendering method so as to render a 3D image, a quality of which is not lower than an existing ray tracing rendering method, at an earlier time.

Figure 3A:
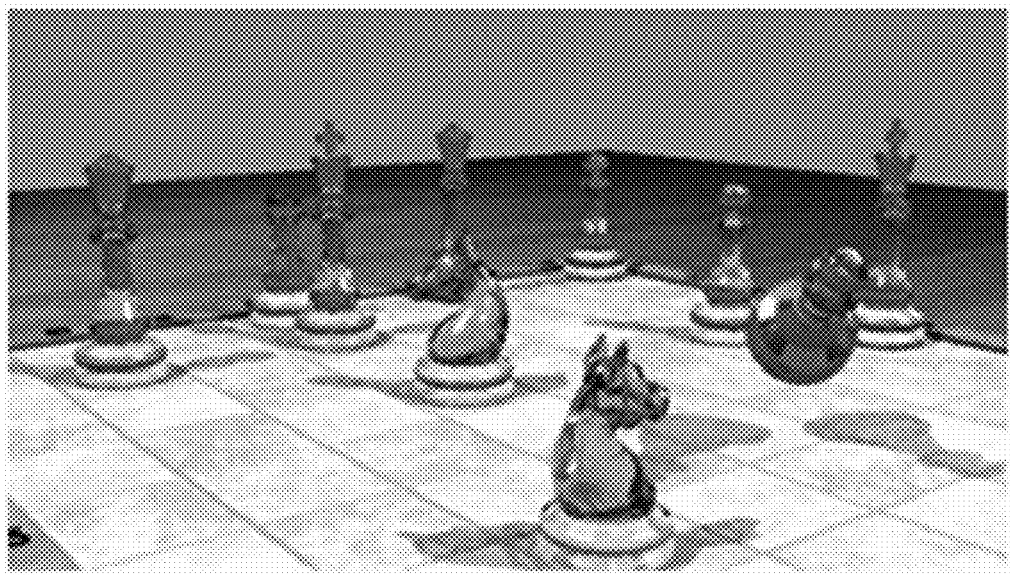
FIG. 3A is a view illustrating a result of rendering a 3-dimensional (3D) image by using an existing ray tracing rendering method.
Figure 3B:
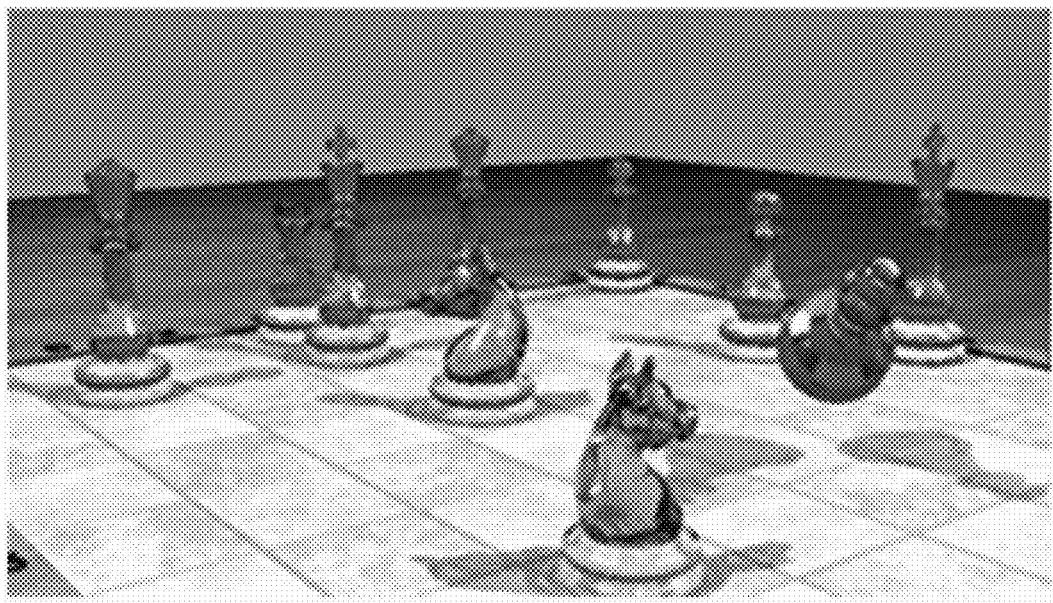
FIG. 3B is a view illustrating a result of rendering a 3D image by using a plurality of rendering methods, according to an exemplary embodiment.

In particular, FIG. 3A is a view illustrating a result of rendering a 3D screen by using an existing ray tracing rendering method. FIG. 3B is a view illustrating a result of rendering a 3D screen by using a plurality of rendering methods, according to an exemplary embodiment. Referring to FIGS. 3A and 3B, although a 3D screen is output by using a plurality of rendering methods according to an exemplary embodiment, the 3D screen may be provided with a quality that is similar to a result of rendering a 3D screen by using only a ray tracing rendering method. A faster rendering job may be performed in accordance with an exemplary embodiment than by rendering the 3D screen by using only the ray tracing rendering method.

A method of rendering a 3D image by using the image outputting device 100 will now be described with reference to FIGS. 4 and 5.

Figure 4:
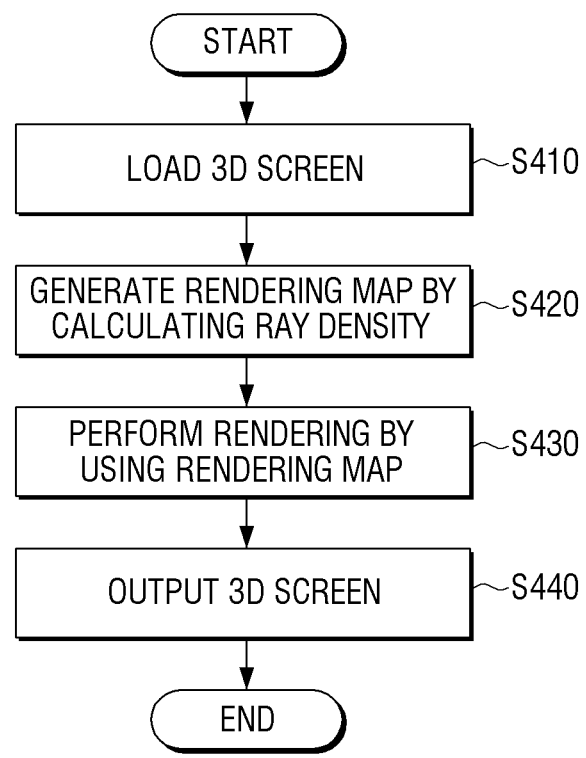
FIG. 4 is a flowchart illustrating a method of rendering a 3D image, according to an exemplary embodiment.
Figure 5:
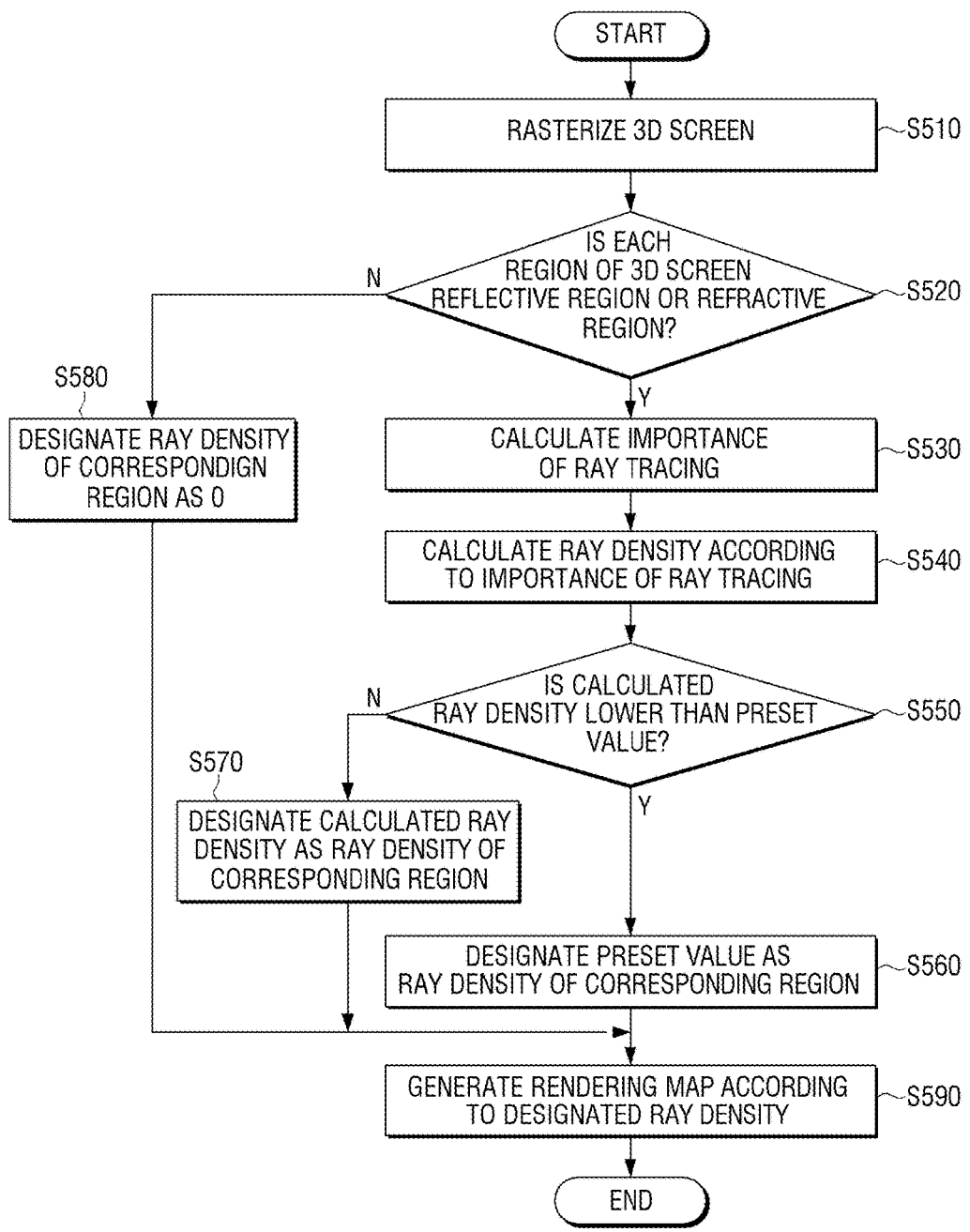
FIG. 5 is a flowchart illustrating a method of generating a rendering map according to ray densities, according to an exemplary embodiment.

FIG. 4 is a flowchart illustrating a method for rendering a 3D image, according to an exemplary embodiment.

In operation S410, the image outputting device 100 loads a 3D screen. In particular, the image outputting device 100 may load data that relates to a 3D screen that is pre-stored as a background screen, but this is only an exemplary embodiment. Therefore, the image outputting device 100 may load a 3D screen that is received from an external source.

In operation S420, the image outputting device 100 calculates a ray density in order to generate a rendering map. A method of generating a rendering map by using the image outputting device 100 will now be described in detail with reference to FIG. 5.

In operation S510, the image outputting device 100 rasterizes the loaded 3D screen. An object forming the 3D screen may be mapped on an output frame buffer by performing a rasterization job.

In operation S520, the image outputting device 100 determines whether each region of the 3D screen is a reflective region or a refractive region.

If it is determined in operation S520 that each region of the 3D screen is the reflective region or the refractive region, the image outputting device 100 calculates an importance of ray tracing in operation S530. In particular, the image outputting device 100 may calculate the importance of the ray tracing according to a method as described with reference to Equation 1 above. More particularly, when the region is determined as being relatively close to a camera, or when a normal vector with respect to the region and a camera direction is determined as being relatively close to vertical, the image outputting device 100 may calculate the importance of the ray tracing as having a correspondingly high value. Further, when the region is determined as being relatively far away from the camera, or when the normal vector with respect to the camera direction and the region is determined as being relatively close to parallel, the image outputting device 100 may calculate the importance of the ray tracing as having a correspondingly low value. The image outputting device 100 may calculate the importance of the ray tracing by using a velocity or an acceleration of the object. In detail, if the velocity or the acceleration of the object is lower than or equal to a preset value T, the image outputting device 100 may calculate an importance of ray tracing of a region where the object is displayed as having a value that increases with an increase in the calculated velocity or acceleration. However, if the velocity or the acceleration of the object exceeds the preset value T, the image outputting device 100 may calculate the importance of the ray tracing of the region where the object is displayed as having a value that decreases with an increase in the velocity or the acceleration.

In operation S540, the image outputting device 100 calculates a ray density according to the importance of the ray tracing. In particular, the importance of the ray tracing may refer to the number of rays incident onto a particular region, and the image outputting device 100 may divide the number of rays incident onto a particular region by a pixel size of the particular region in order to calculate the ray density as expressed in Equation 2 above.

In operation S550, the image outputting device 100 determines whether the calculated ray density is lower than a preset value.

If it is determined in operation S550 that the calculated ray density is lower than the preset value, the image outputting device 100 designates the preset value as a ray density of the corresponding region in operation S560. If it is determined in operation S550 that the calculated ray density is greater than or equal to the preset value, the image outputting device 100 designates the calculated ray density as the ray density of the corresponding region in operation S570.

If it is determined in operation S520 that the corresponding region is not the reflective region or the refractive region, then in operation S580, the image outputting device 100 designates the ray density of the corresponding region as being equal to zero.

In operation S590, the image outputting device 100 generates a rendering map according to the designated ray density. In particular, the image outputting device 100 may generate a rendering map that has a gray scale that corresponds to the designated ray density.

Referring to FIG. 4 again, in operation S430, the image outputting device 100 performs rendering by using the generated rendering map. In particular, the image outputting device 100 may render a region having a ray density of zero by using a rasterization rendering method, and may render a region having a ray density higher than or equal to a preset value by using a ray tracing rendering method. The image outputting device 100 may also irradiate rays onto all pixels of a region having a ray density of one in order to render the region. Further, the image outputting device 100 may irradiate rays onto some of all pixels of a region having a ray density higher than or equal to a preset value and lower than one in order to render the region.

The image outputting device 100 may include hardware that is configured for performing rendering by using a rasterization rendering method and hardware that is configured for performing rendering by using a ray tracing rendering method. The respective pieces of hardware may perform rendering jobs in parallel.

In operation S440, the image outputting device 100 outputs the rendered 3D screen. In particular, the image outputting device 100 may output a 3D screen by using an image display unit such as a display, or may output a 3D screen by using a printing unit, such as a printer or the like.

According to a method of rendering a 3D image as described above, a 3D screen, which has a quality with no significant difference in comparison with an existing ray tracing rendering method, is output. Simultaneously, an amount of an arithmetic operation may be reduced, thereby enabling an output of a 3D image at a faster processing velocity.

Further, a method of rendering a 3D image according to the above-described various exemplary embodiments may be realized as a program and then provided to a display device.

In detail, one or more exemplary embodiments may provide a non-transitory computer-readable medium that stores a program that includes instructions for performing the following operations: loading a 3D screen; calculating a ray density of each region of the loaded 3D screen in order to generate a rendering map; rendering the 3D screen by using the rendering map; and outputting the rendered 3D screen.

The non-transitory computer-readable medium refers to a medium which does not store data for a short time such as a register, a cache memory, a memory, or the like, but semi-permanently stores data and is readable by a device. In detail, the above-described applications or programs may be stored and provided on a non-transitory computer readable medium such as a compact disk (CD), a digital versatile disk (DVD), a hard disk, a blue-ray disk, a universal serial bus (USB), a memory card, a read-only memory (ROM), or the like.

The foregoing exemplary embodiments and advantages are merely exemplary and are not to be construed as limiting. The present disclosure can be readily applied to other types of apparatuses. Also, the description of the exemplary embodiments is intended to be illustrative, and not to limit the scope of the claims, and many alternatives, modifications, and variations will be apparent to those of ordinary skill in the art.

What is claimed is:

1. A method for rendering a three-dimensional (3D) image, the method comprising:
    loading a 3D screen;
    obtaining, for a particular region of the loaded 3D screen, an importance of ray tracing based on an identification whether the particular region is located within a predetermined distance with respect to a camera;
    obtaining, a ray density of each region of the loaded 3D screen based on the importance of the ray tracing;
    generating a rendering map by using the ray density;
    rendering the 3D screen by using the rendering map; and
    outputting the rendered 3D screen,
    wherein the generating the rendering map comprises generating the rendering map that has a gray scale that corresponds to a designated ray density.

2. The method of claim 1, wherein the generating the rendering map comprises:
    determining whether the particular region of the loaded 3D screen is a reflective region or a refractive region;
    obtaining the importance of the ray tracing in response to the particular region being determined as the reflective region or the refractive region; and
    obtaining the ray density based on the importance of the ray tracing.

3. The method of claim 2, wherein the obtaining the importance of the ray tracing comprises:
    when the particular region is determined as being located within the predetermined distance with respect to the camera or a normal vector with respect to the particular region is determined as being within a first predetermined angular displacement from a perpendicular direction with respect to a camera direction, obtaining the importance of the ray tracing as having a value that is greater than a predetermined threshold; and when the particular region is determined as being located farther away from the camera than the predetermined distance or the normal vector with respect to the particular region is determined as being within a second predetermined angular displacement from a parallel direction with respect to the camera direction, obtaining the importance of the ray tracing as having a value that is lower than the predetermined threshold.

4. The method of claim 3, wherein the obtaining the ray density comprises:
    adjusting a number of rays incident onto a particular region based on the importance of the ray tracing and dividing the number of rays incident onto the particular region by a pixel size of the particular region.

5. The method of claim 4, further comprising:
    determining whether the ray density is lower than a preset value; and
    when the ray density of a first region is determined as being lower than the preset value, designating the preset value as a ray density of the first region, and when the ray density of a second region is determined as being greater than or equal to the preset value, designating the ray density of the second region as a ray density of the second region.

6. The method of claim 5, further comprising:
    when a third region is determined as not being the refractive region or the refractive region, designating a ray density of the third region as being equal to zero.

7. The method of claim 6, wherein the rendering the 3D screen comprises:
    when the ray density of the third region is designated as being equal to zero, rendering the third region of the 3D screen by using a rasterization rendering method, and when the ray density of the second region is determined as being greater than or equal to the preset value, rendering the second region of the 3D screen by using a ray tracing rendering method.

8. The method of claim 7, wherein the rendering the 3D screen further comprises:
    when the designated ray density for a particular region is equal to one, irradiating rays onto all pixels of the particular region; and when the designated ray density for the particular region is greater than or equal to the preset value and lower than one, irradiating rays onto some pixels of the particular region.

9. The method of claim 8, wherein the rendering the 3D screen further comprises:
    when the designated ray density for the particular region is greater than or equal to the preset value and lower than one, interpolating a pixel onto which a ray is not irradiated by using a pixel onto which a ray is irradiated.

10. The method of claim 2, wherein the obtaining the importance of the ray tracing comprises:
    obtaining at least one from among a velocity of an object included in the 3D screen and an acceleration of the object included in the 3D screen; and
    when the at least one from among the velocity and the acceleration is equal to or less than a preset value, the importance of the ray tracing has a value that increases in correspondence with an increase in the velocity or the acceleration of the object, and when the at least one from among the velocity and the acceleration is greater than the preset value, the importance of the ray tracing has a value that decreases in correspondence with an increase in the velocity or the acceleration of the object.

11. An image outputting device comprising:
a processor configured to implement:
a loader configured to load a three-dimensional (3D) screen;
an obtainer configured to obtain, for a particular region of the loaded 3D screen, an importance of ray tracing based on an identification whether the particular region is located within a predetermined distance with respect to a camera, and to obtain a ray density of each region of the loaded 3D screen based on the importance of the ray tracing;
a rendering map generator configured to generate a rendering map by using the ca laced ray density;
a renderer configured to render the 3D screen by using the rendering map; and
an output module configured to output the rendered 3D screen,
wherein the rendering map generator is further configured to generate the rendering map that has a gray scale that corresponds to a designated ray density.

12. The image outputting device of claim 11, wherein the rendering map generator is further configured to determine whether each region of the loaded 3D screen is a reflective region or a refractive region, to obtain the importance of the ray tracing in response to the region being determined as the reflective region or the refractive region, and to obtain the ray density based on the importance of the ray tracing.

13. The image outputting device of claim 12, wherein the rendering map generator is further configured to obtain the importance of the ray tracing as having a value that is greater than a predetermined threshold value when the particular region is determined as being located within the predetermined distance with respect to the camera or when a normal vector with respect to the particular region is determined as being within a first predetermined angular displacement from a perpendicular direction with respect to a camera direction, and to obtain the importance of the ray tracing as having a value that is lower than the predetermined threshold value when the particular region is determined as being located farther away than the predetermined distance with respect to the camera or when the normal vector with respect to the particular region is determined as being within a second predetermined angular displacement from a parallel direction with respect to the camera direction.

14. The image outputting device of claim 13, wherein the rendering map generator is further configured to adjust a number of rays incident onto a particular region based on the importance of the ray tracing and to divide the number of rays incident onto the particular region by a pixel size of the particular region in order to obtain the ray density.

15. The image outputting device of claim 14, wherein the rendering map generator is further configured to determine whether the ray density is lower than a preset value, and when the ray density of a first region is determined as being lower than the preset value, to designate the preset value as a ray density of the first region, and when the ray density of a second region is determined as being greater than or equal to the preset value, to designate the ray density of the second region as a ray density of the second region.

16. The image outputting device of claim 15, wherein the rendering map generator is further configured to designate the ray density of a third region as being equal to zero when the third region is determined as not being the reflective region or the refractive region.

17. The image outputting device of claim 16, wherein when the ray density of the third region is designated as being equal to zero, the renderer is further configured to render the third region of the 3D screen by using a rasterization rendering method, and when the ray density of the second region is determined as being greater than the preset value, the renderer is further configured to render the second region of the 3D screen by using a ray tracing rendering method.

18. The image outputting device of claim 17, wherein when the designated ray density for a particular region is equal to one, the renderer is further configured to irradiate rays onto all pixels of the particular region; and when the designated ray density for the particular region is greater than or equal to the preset value and lower than one, the renderer is further configured to irradiate rays onto some pixels of the particular region.

19. The image outputting device of claim 18, wherein when the designated ray density for the particular region is greater than or equal to the preset value and lower than one, the renderer is further configured to interpolate a pixel onto which a ray is not irradiated by using a pixel onto which a ray is irradiated.

20. The image outputting device of claim 12, wherein the rendering map generator is further configured to obtain at least one from among a velocity of an object included in the 3D screen and an acceleration of the object included in the 3D screen, to obtain the importance of the ray tracing as having a value that increases in correspondence with an increase in a value of the velocity or the acceleration of the object when the at least one from among the velocity and the acceleration is lower than or equal to a preset value, and to obtain the importance of the ray tracing as having a value that decreases in correspondence with an increase in a value of the velocity or the acceleration of the object when the at least one from among the velocity and the acceleration is greater than the preset value.

* * * * *